US012776555B2

(12) United States Patent
Kim

(10) Patent No.: US 12,776,555 B2
(45) Date of Patent: Oct. 27, 2026

(54) BATTERY PACK AND ASSEMBLE METHOD THEREOF

(71) Applicants: Hyundai Motor Company, Seoul (KR); Kia Corporation, Seoul (KR)

(72) Inventor: Kyungmo Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 962 days.

(21) Appl. No.: 18/074,024

(22) Filed: Dec. 2, 2022

(65) Prior Publication Data

US 2024/0014528 A1 Jan. 11, 2024

(30) Foreign Application Priority Data

Jul. 11, 2022 (KR) ........................ 10-2022-0084989

(51) Int. Cl.

| | |
|---|---|
| ***H01M 50/569*** | (2021.01) |
| ***H01M 50/209*** | (2021.01) |
| ***H01M 50/291*** | (2021.01) |
| ***H01M 50/507*** | (2021.01) |

(52) U.S. Cl.

CPC ....... *H01M 50/569* (2021.01); *H01M 50/209* (2021.01); *H01M 50/291* (2021.01); *H01M 50/507* (2021.01); *H01M 2220/20* (2013.01)

(58) Field of Classification Search

CPC ............. H01M 50/569; H01M 50/209; H01M 50/291; H01M 50/507; H01M 2220/20; H01M 50/519; H01M 50/211; H01M 50/244; H01M 50/517; Y02E 60/10

See application file for complete search history.

(56) References Cited

U.S. PATENT DOCUMENTS

| | | | | |
|---|---|---|---|---|
| 9,755,212 | B2 * | 9/2017 | Kedir | H01M 10/486 |
| 11,158,912 | B2 * | 10/2021 | Chi | H01R 4/4846 |
| 11,843,213 | B2 * | 12/2023 | Kim | H01M 50/503 |
| 12,294,115 | B2 * | 5/2025 | Kim | H01M 50/209 |
| 2014/0212724 | A1 * | 7/2014 | Lee | H01M 50/512 429/99 |
| 2015/0037641 | A1 * | 2/2015 | Pinon | H01M 50/517 429/99 |
| 2015/0171399 | A1 * | 6/2015 | Jeong | H01M 50/578 429/160 |
| 2015/0207127 | A1 * | 7/2015 | Davis | H01M 10/482 429/90 |
| 2016/0248070 | A1 * | 8/2016 | Ahn | H01M 50/209 |

(Continued)

FOREIGN PATENT DOCUMENTS

| | | |
|---|---|---|
| KR | 10-2015-0049277 A | 5/2015 |
| KR | 10-2017-0057740 A | 5/2017 |

*Primary Examiner* — Michael L Dignan

(74) *Attorney, Agent, or Firm* — Banner & Witcoff, Ltd.

(57) ABSTRACT

A battery pack may comprise a plurality of battery cells, each formed as a solid state secondary battery cell, aligned in a preset direction. The battery pack may comprise a pack tray, a sensing circuit unit coupled to the pack tray, a sensing block unit vertically coupled to the sensing circuit unit, and a tray cover coupled to an upper portion of the pack tray. The sensing circuit unit may comprise a plurality of sensing busbars that are electrically connected to leads in the plurality of battery cells. The sensing block unit may comprise a plurality of wedge members configured to tight-contact the leads and the plurality of sensing busbars.

20 Claims, 13 Drawing Sheets

30

(56) References Cited

U.S. PATENT DOCUMENTS

| | | | | |
|---|---|---|---|---|
| 2018/0375179 | A1* | 12/2018 | King | H01M 10/6554 |
| 2023/0110762 | A1* | 4/2023 | Park | H01M 10/653<br>429/120 |

* cited by examiner

13

(a)

(b)

BATTERY PACK AND ASSEMBLE METHOD THEREOF

CROSS-REFERENCE TO RELATED APPLICATION

This application claims priority to and the benefit of Korean Patent Application No. 10-2022-0084989 filed in the Korean Intellectual Property Office on Jul. 11, 2022, the entire contents of which are incorporated herein by reference.

TECHNICAL FIELD

The present disclosure relates to a battery pack and an assembling method thereof. More particularly, the present disclosure relates to a battery pack in which battery cells of a solid state secondary battery cell (for example, a polymer-based secondary battery cell) are packed, and an assembling method thereof.

BACKGROUND

Environmental regulations and fuel efficiency regulations have caused increased demand for environment-friendly vehicles such as hybrid vehicles and electric vehicles.

Such environment-friendly vehicles use high-voltage battery systems configured to supply electricity to an electric driving power source. The high voltage battery system may comprise a battery pack in which a plurality of battery cells may be electrically connected.

An example of a unit battery cell currently widely used may be a unit secondary battery cell, which is rechargeable. An example of a unit secondary battery cell is a pouch-type lithium ion battery cell using a liquid electrolyte.

When configuring a battery pack by electrically connecting a plurality of such battery cells, at least one battery module in which a plurality of battery cells are stacked may be configured, and then other components may be added to configure the battery pack. The at least one battery module may be installed in a pack housing, and the pack housing may be assembled to the vehicle body.

In the case of an electric and/or hybrid vehicle, it is important to secure an output voltage or a charging and discharging capacity of the plurality of battery cells comprised in the battery pack. In addition, a major factor affecting the mileage of the electric and/or hybrid vehicle is the energy capacity ratio of the plurality of battery cells. That is, as more battery cells are mounted in a limited space of the battery pack, the mileage of the electric vehicle increases.

However, the pack housing may further limit space for battery cells in the battery pack, which may reduce an installation capacity (e.g., capacity ratio) of the plurality of battery cells.

The at least one battery module may comprise a component for surface-pressurizing the plurality of battery cells using a liquid electrolyte, and/or a component for controlling a swelling reaction force of the plurality of battery cells.

The battery pack in which the at least one battery module may be mounted may comprise a cooling component for cooling the plurality of battery cells and/or a welding structure for electrically interconnecting the plurality of battery cells.

Therefore, in some battery assembly structures, due to the number of parts, it may be difficult to maximize the installation capacity (e.g., installation volume) of the plurality of battery cells. Also, assembling and installing the battery may be complicated and comprise a number of assembly processes.

The information in this Background section is only for enhancement of understanding the disclosure, and it may contain information that does not form the prior art to the disclosure.

SUMMARY

The following summary presents a simplified summary of certain features. The summary is not an extensive overview and is not intended to identify key or critical elements.

Systems, apparatuses, and methods may be described for a battery pack and assembly thereof. The battery pack may comprise a plurality of battery cells, a pack tray, a sensing circuit, and a sensing block. The plurality of battery cells may be aligned in an alignment direction. The sensing circuit may be may be coupled to the pack tray and comprise a plurality of sensing busbars that may be electrically connected to leads of the plurality of battery cells. The sensing block may be coupled to the sensing circuit and may comprise a plurality of wedges configured to contact the leads and the plurality of sensing busbars.

An assembling method may comprise coupling a sensing circuit to a pack tray, disposing a plurality of battery cells on a base of the sensing circuit in an alignment direction, electrically connecting leads provided in each of the plurality of battery cells to a plurality of sensing busbars of the sensing circuit, coupling a sensing block to the sensing circuit; and contacting the leads to the plurality of sensing busbars via a plurality of wedges of the sensing block.

The above and other features of the disclosure may be described in greater detail below.

BRIEF DESCRIPTION OF THE DRAWINGS

The drawings are intended to be used as references for describing the examples of the present disclosure, and the accompanying drawings should not be construed as limiting the technical spirit of the present disclosure.

It should be understood that the above-referenced drawings are not necessarily to scale, and present a somewhat simplified representation of various preferred features illustrative of the basic principles of the disclosure. The specific design features of the present disclosure, comprising, for example, specific dimensions, orientations, locations, and shapes, will be determined in part by the particular intended application and use environment.

DETAILED DESCRIPTION

The present disclosure will be described more fully hereinafter with reference to the accompanying drawings, in which examples of the disclosure are shown. As those skilled in the art would realize, the described embodiments may be modified in various different ways, all without departing from the spirit or scope of the present disclosure.

The terminology used herein is for the purpose of describing particular embodiments only and is not intended to be limiting of the present disclosure. As used herein, the singular forms are intended to comprise the plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" may comprise any one or all combinations of one or more related items. The term "coupled" denotes a physical relationship between two components in which components are directly connected to each other or indirectly via one or more intermediary components, by welding, self-piercing rivet (SPR), structural adhesive, and the like.

It is understood that the term "vehicle," "vehicular," "car," or other similar term as used herein is inclusive of, in general, passenger automobiles comprising sport cars, sports utility vehicles (SUV), buses, trucks, various commercial vehicles, and inclusive of hybrid vehicles, electric vehicles, hybrid electric vehicles, hydrogen-powered vehicles, purpose built vehicles (PBV), and other alternative fuel vehicles (e.g., fuels derived from resources other than petroleum).

Hereinafter, an example of the present disclosure is described in detail with reference to the accompanying drawings.

Figure 1:
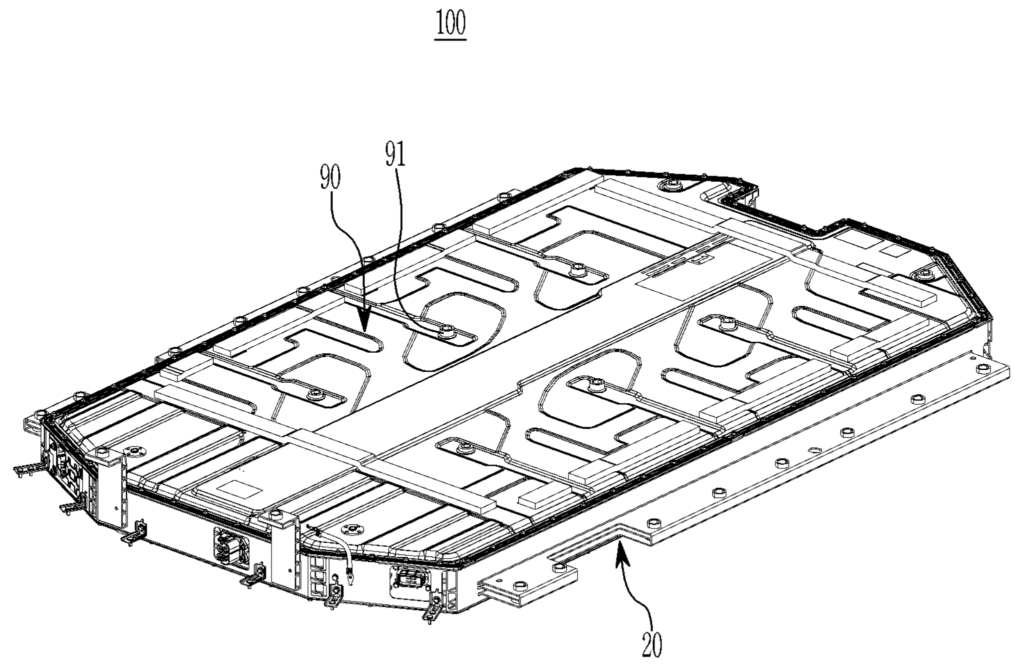
FIG. 1 is a perspective view of a battery pack according to an example.
Figure 2:
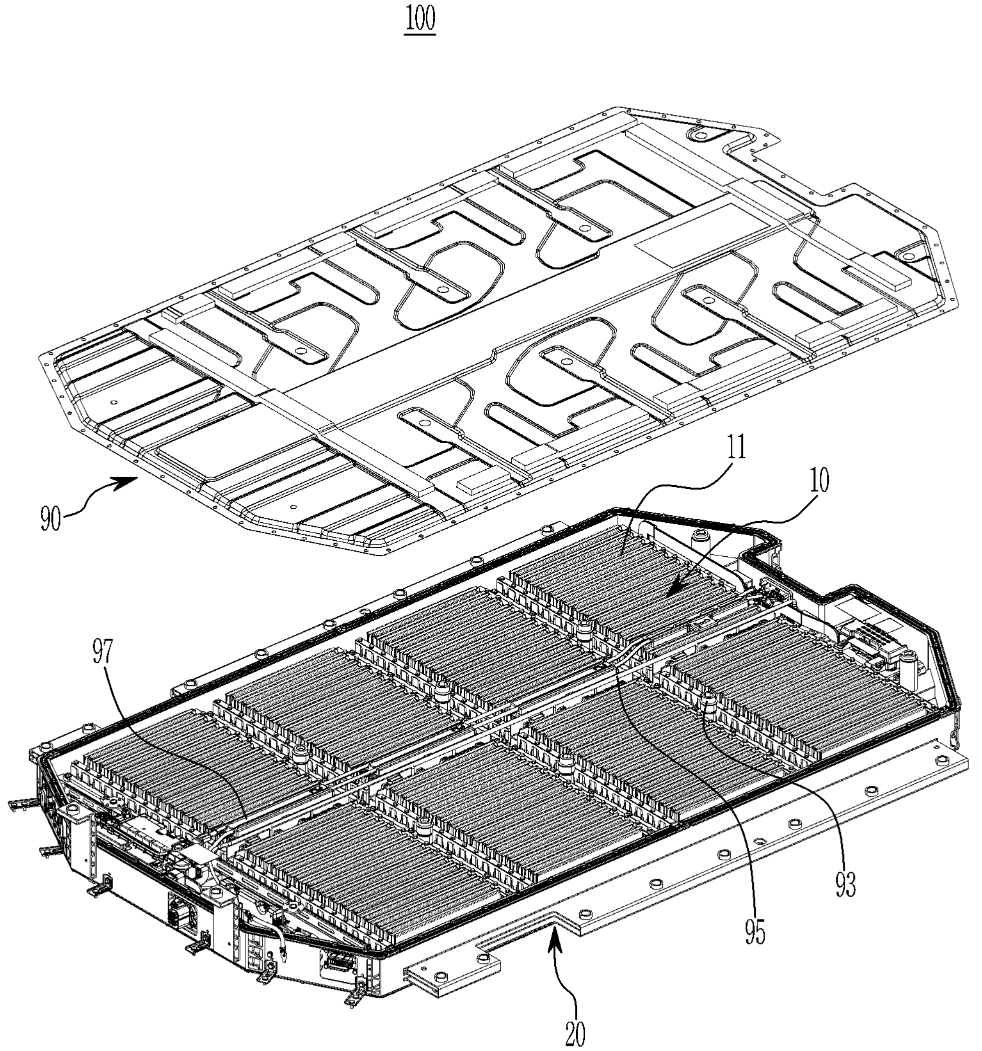
FIG. 2 and FIG. 3 are exploded perspective views of a battery pack according to an example.
Figure 3:
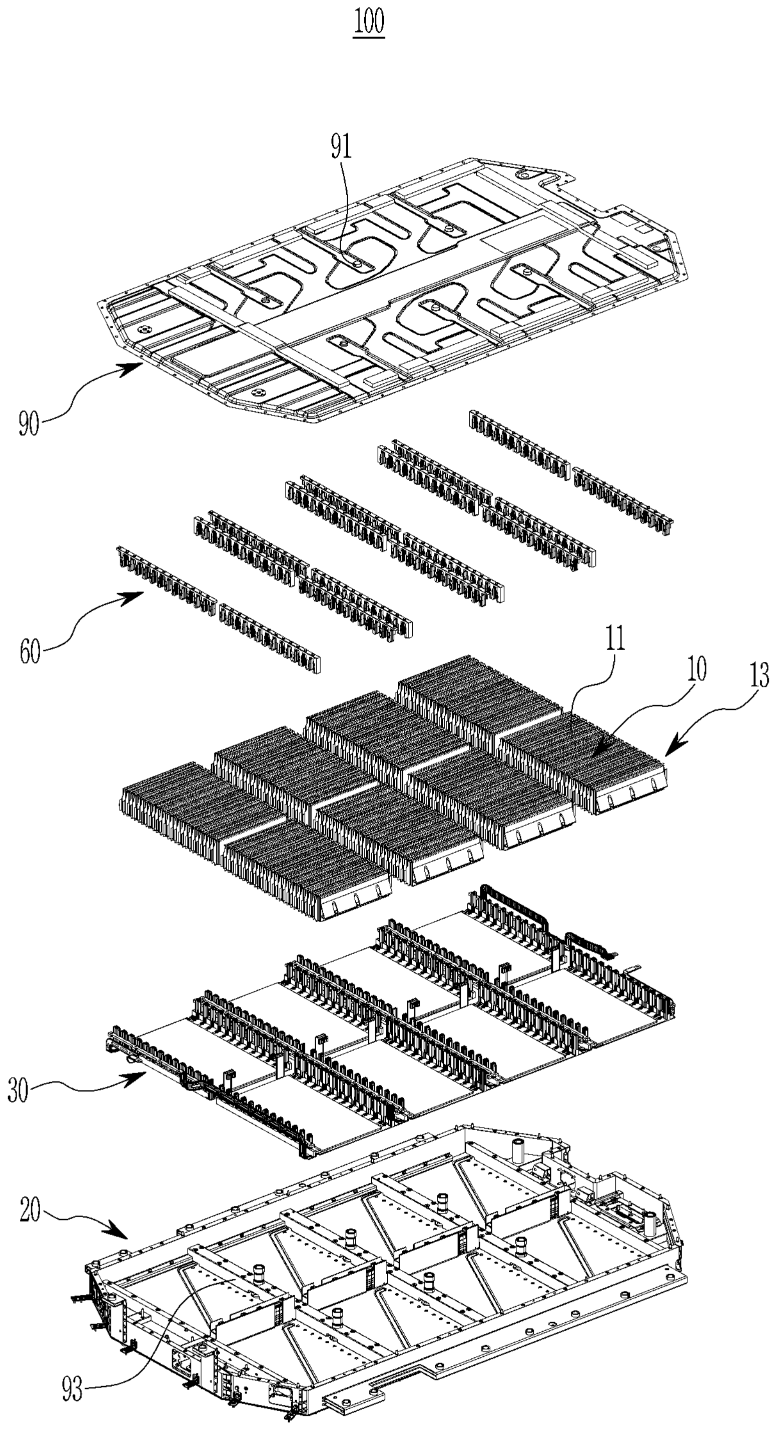

FIG. 1 to FIG. 3 show a battery pack 100 according to the disclosure. Without limitation, the battery pack 100 may be for use in an environment-friendly vehicle, such as a hybrid vehicle, an electric vehicle, a hydrogen-powered vehicle (also called a hydrogen electric vehicle), and/or an electric vehicle-based purpose-built mobility vehicle (PBV vehicle).

The battery pack 100 may be mountable on a vehicle body, such as when assembling various components to the vehicle body of an electric vehicle. The battery pack 100 may be mountable on a lower body of the vehicle body, such as a chassis frame, a rolling chassis, and/or a body structure of a skateboard type.

In this disclosure, reference directions for describing constituent elements may be made as, in an example, an alignment direction of a plurality of battery cells, a direction crossing the alignment direction, a vertical direction. The vertical direction refers to vertical with respect to an orientation (e.g., of reference numerals) in the drawings. A horizontal direction would be a direction approximately perpendicular to the vertical direction.

Furthermore, in this specification, "upper end portion", "upper portion", "upper end", or "upper portion surface" of a component indicates end portion, portion, end, or surface of the component that is relatively positioned higher in the drawing, and "lower end portion", "lower portion", "lower end", or "lower portion surface" of a component indicates end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component comprising the end.

The battery pack 100 according to an example may comprise a plurality of battery cells 10 disposed (or arranged) along a preset direction in its interior. The plurality of battery cells 10 may be stacked (e.g., disposed on each other) and/or electrically connected to each other.

The plurality of battery cells 10 may be, for example, pouch type, prismatic type, or cylindrical type battery cells. Pouch type battery cells may be more lightweight and/or flexible, and/or better able to efficiently fill space. A pouch type is taken as an example of the plurality of battery cells 10 in the figures and following discussion.

Each battery cell of the plurality of battery cells 10 may be, in an example, a solid state secondary battery cell 11. The plurality of battery cells 10 may use a polymer-based electrolyte. The plurality of battery cells 10 may be disposed in an interior of the battery pack 100 in a cell to pack (CTP) structure.

The solid state secondary battery cell 11 may have excellent safety due to low risk of explosion and/or combustion, high energy density, high output power, stable performance in a wide temperature range, and/or a simple cell structure.

Figure 4:
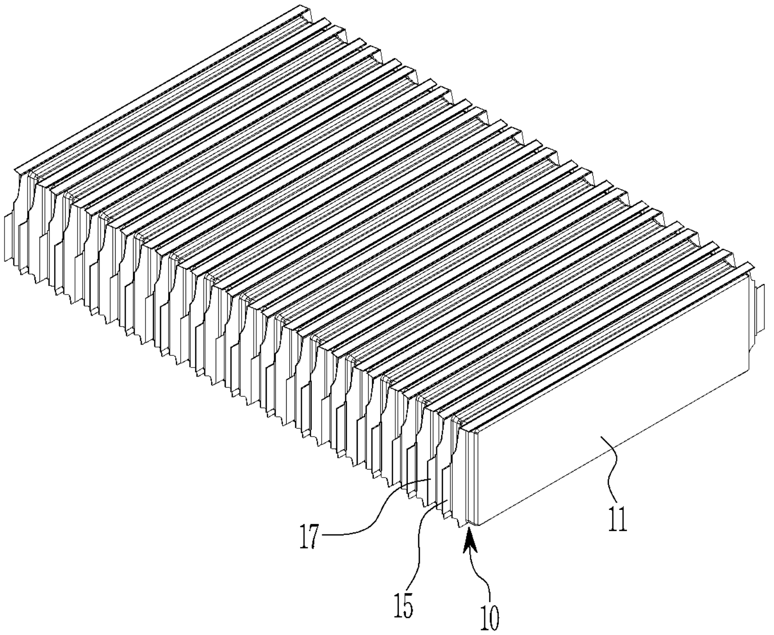
FIG. 4 is a perspective view of a cell array applied to a battery pack according to an example.

As shown in FIG. 4, the plurality of battery cells 10 may form a cell array 13 arranged in along an alignment direction. For example (and as illustrated in FIG. 4) the plurality of battery cells 10 in the cell array 13 may be horizontally arranged to contact each other, while standing in the vertical direction.

Each of the plurality of battery cells 10 may comprise a positive electrode lead 15 and/or a negative electrode lead 17. The electrode lead 15 and/or the negative electrode lead 17 may comprise a copper material.

The battery pack 100 may be configured in a non-cooling, non-pressurizing, and/or non-welding structure of the plurality of battery cells 10. The characteristics of the solid state secondary battery cell 11 may allow for the structure of the plurality of battery cells 10. The battery pack 100 may be configured in a structure to maximize a volume ratio of the plurality of battery cells in the battery pack 100.

The battery pack 100 according to an example may comprise a pack tray a sensing circuit unit 30 (e.g., a sensing circuit), a sensing block unit 60 (e.g., a sensing block), and/or a tray cover 90.

In an example, the pack tray 20 may be configured to mount constituent elements, as will be described later. The pack tray 20 may be provided as a housing having an open upper end, and an interior surface (a surface configured to be towards the plurality of battery cells 10), such as an interior bottom (e.g., lower) surface 21.

Figure 5:
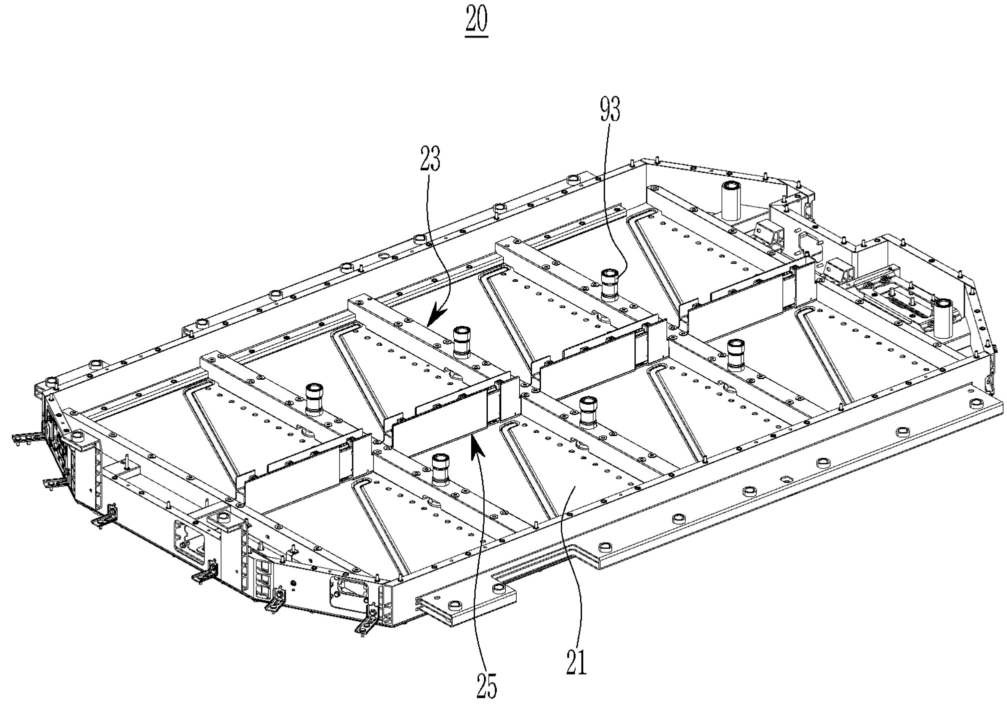
FIG. 5 is a perspective view of a pack tray applied to a battery pack according to an example.

Referring to FIG. 5, the pack tray according to an example may comprise at least one cross member 23 and/or at least one cell barrier 25.

The at least one cross member 23 may be installed on the interior bottom surface 21 of the pack tray 20 and/or along an alignment direction of the plurality of battery cells 10 (e.g., as shown in FIG. 4).

In an example, the at least one cross member 23 may be provided in a plurality. The plurality of cross members 23 may be disposed apart from each other at an interval along a direction crossing the alignment direction of the plurality of battery cells 10, and/or may be coupled to the interior bottom surface 21 of the pack tray 20.

The at least one cell barrier 25 may be configured to, together with the at least one cross member 23, partition an interior of the pack tray 20 into a plurality of regions. The at least one cell barrier 25 may be installed on the interior bottom surface 21 of the pack tray 20 along a direction crossing the at least one cross member 23.

In an example, the at least one cell barrier 25 may be provided in a plurality. The plurality of cell barriers 25 may be disposed apart from each other at an interval along the direction crossing the alignment direction of the plurality of battery cells 10, and/or may be coupled to the interior bottom surface 21 of the pack tray 20.

Referring to FIG. 3, the sensing circuit unit 30 may be configured to be able to sense voltage information of the plurality of battery cells 10. The sensing circuit unit 30 may be coupled to the pack tray 20. Also, or alternatively, the sensing circuit unit 30 may be electrically connected to the positive electrode lead 15 and/or the negative electrode lead 17 (refer to FIG. 4) of each battery cell of the plurality of battery cells 10.

Figure 6:
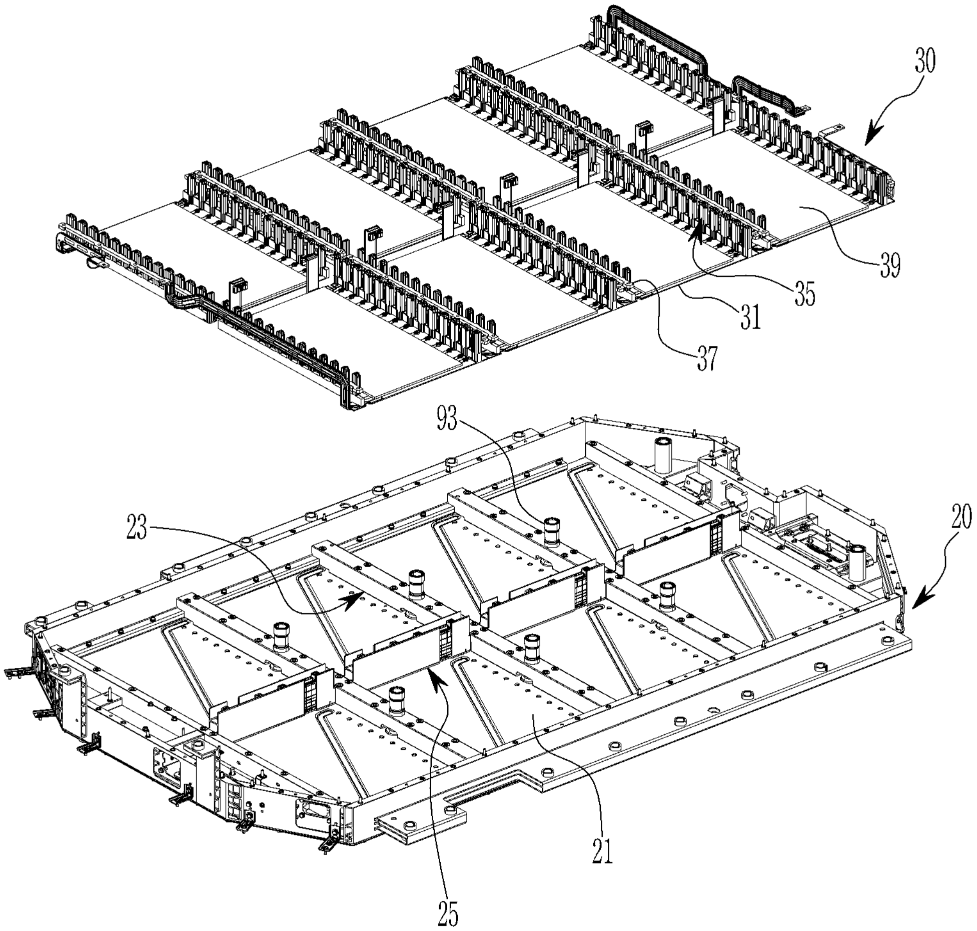
FIG. 6, FIG. 7, and FIG. 8 are a perspective views of a sensing circuit unit applied to a battery pack according to an example.
Figure 7:
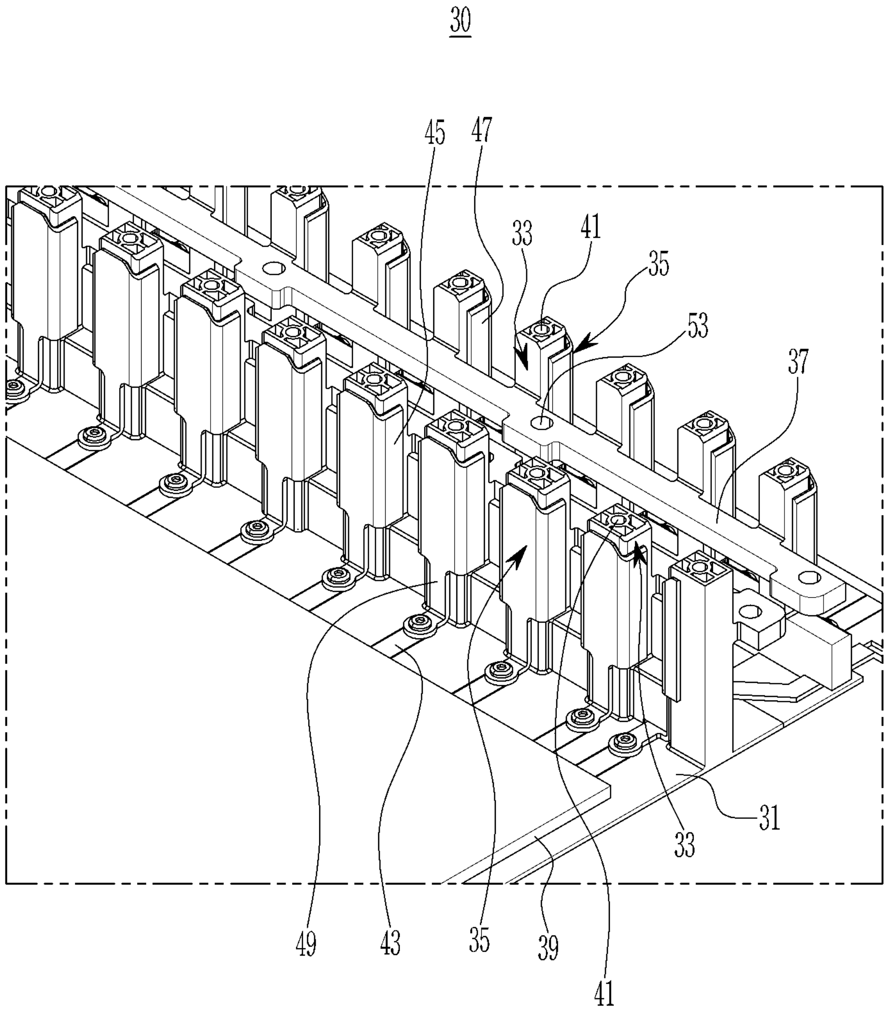
Figure 8:
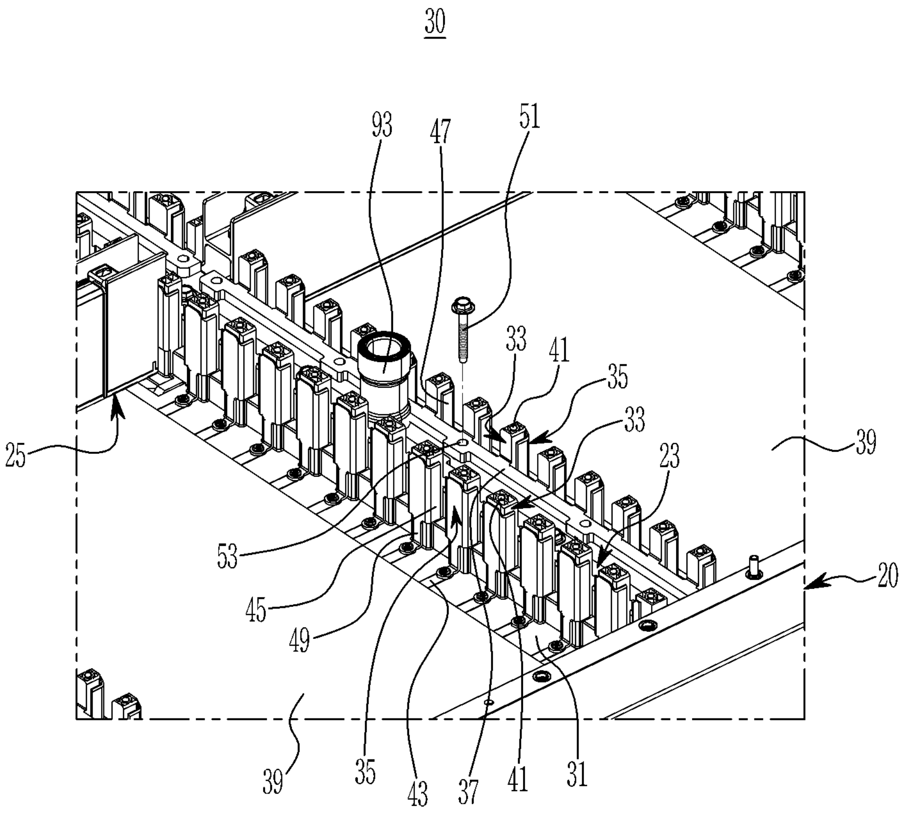

Referring to FIG. 6 to FIG. 8, the sensing circuit unit 30 may comprise a base portion 31, a plurality of support portions 33, a plurality of sensing busbars 35, a joint portion 37, and/or a rubber pad 39.

The base portion 31 may be configured to support the at least one cell array 13 (refer to FIG. 4). The base portion 31 may be installed on the interior bottom surface 21 of the pack tray 20. The base portion 31 may be provided as a plate type, and/or may be fixed to the interior bottom surface 21 of the pack tray 20.

In an example, the base portion 31 may be provided in a plurality. Each of the plurality of base portions 31 may be installed in the plurality of regions partitioned in the interior of the pack tray 20 by the at least one cross member 23 and/or the at least one cell barrier 25 as shown in FIG. 5.

The plurality of support portions 33 may be configured to support the plurality of sensing busbars 35 that will be further described later. The plurality of support portions 33 may be connected to the base portion 31, and/or disposed apart from each other at a preset interval along the alignment direction of the plurality of battery cells 10.

In an example, each of the plurality of support portions 33 may be provided in a rectangular cross-section shape. A threaded fastening hole 41 may be formed in an upper portion of each of the plurality of support portions 33.

The plurality of sensing busbars 35 may be configured to electrically connect the positive electrode lead 15 and/or the negative electrode lead 17 of a copper material provided in each of the plurality of battery cells 10. Each of the plurality of sensing busbars 35 may be coupled to each of the plurality of support portions 33.

Each of the plurality of sensing busbars 35 surrounds each of the plurality of support portions 33, and/or may be fixed to the base portion 31. In an example, each of the plurality of sensing busbars 35 may be provided in the shape of a “C” cross-section to surround each of the plurality of support portions 33.

The plurality of sensing busbars 35 may be electrically connected via a flexible printed circuit board (PCB) 43 known to a person skilled in the art. The flexible PCB 43 may be fixed to an upper surface of the base portion 31.

Figure 9:
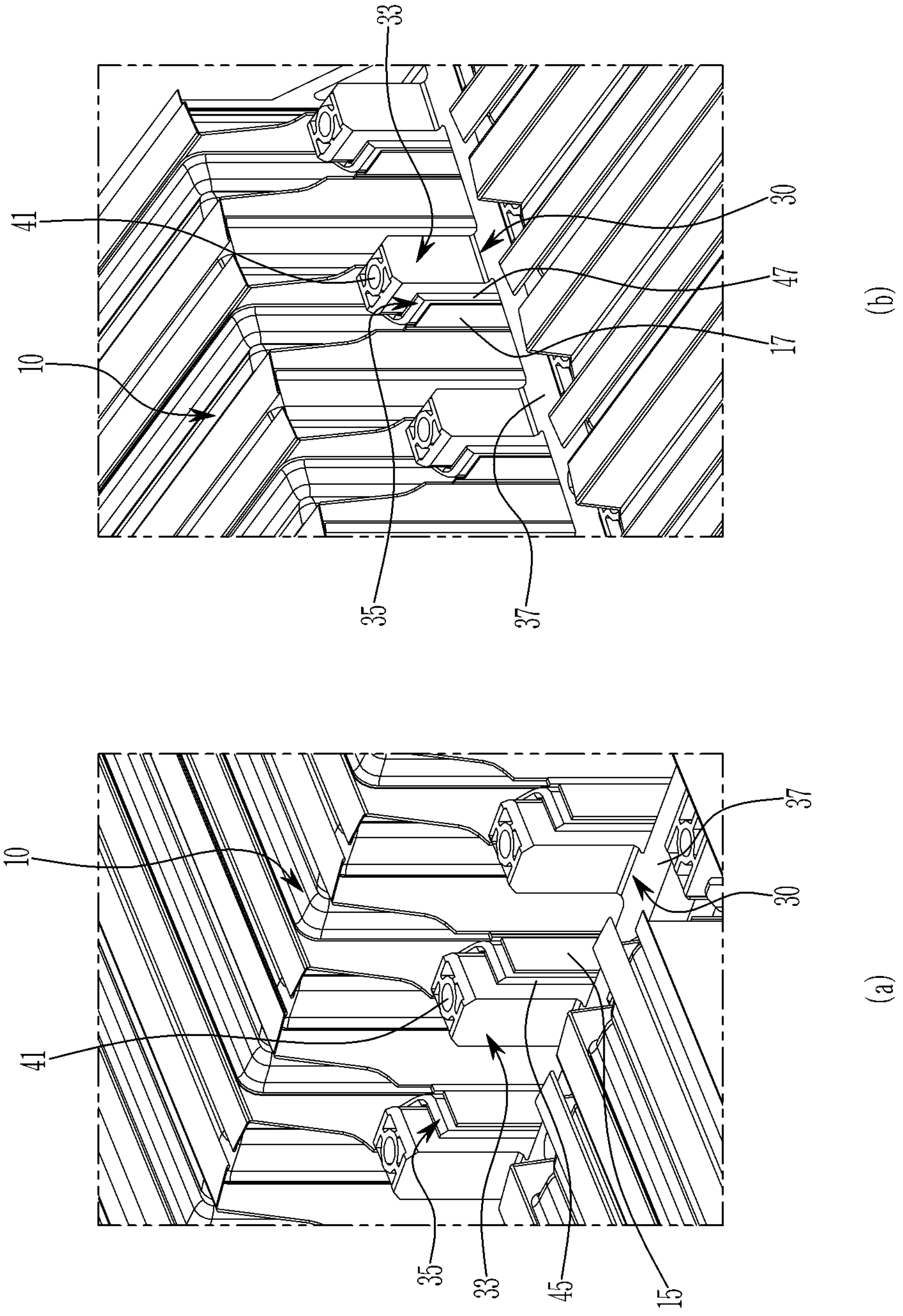
FIG. 9 illustrates a perspective views in different angles showing a connection structure of a battery cell and a sensing busbar of a sensing circuit unit applied to a battery pack according to an example.
Figure 10:
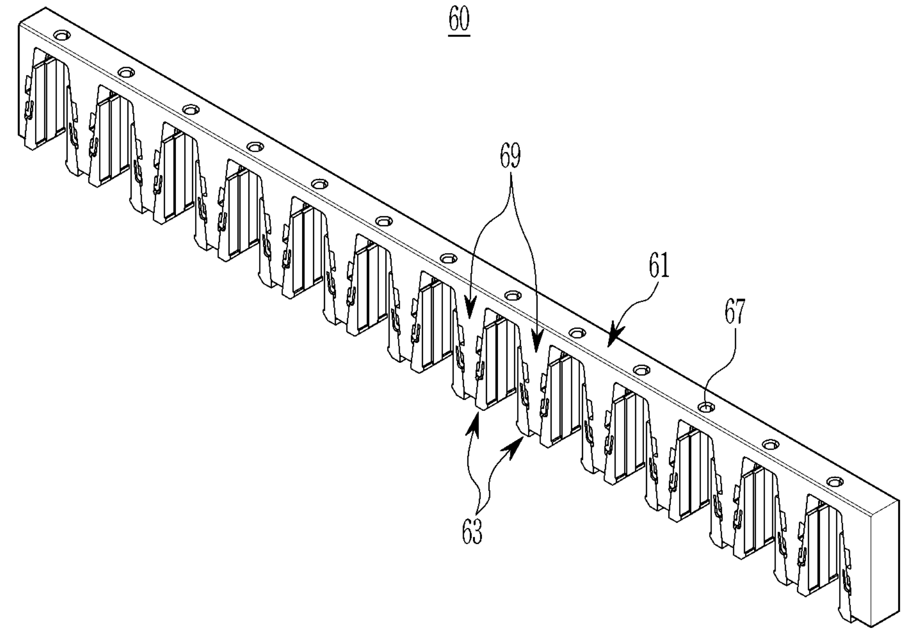
FIG. 10, FIG. 11, FIG. 12, and FIG. 13 are perspective views of a sensing block unit applied to a battery pack according to an example.
Figure 11:
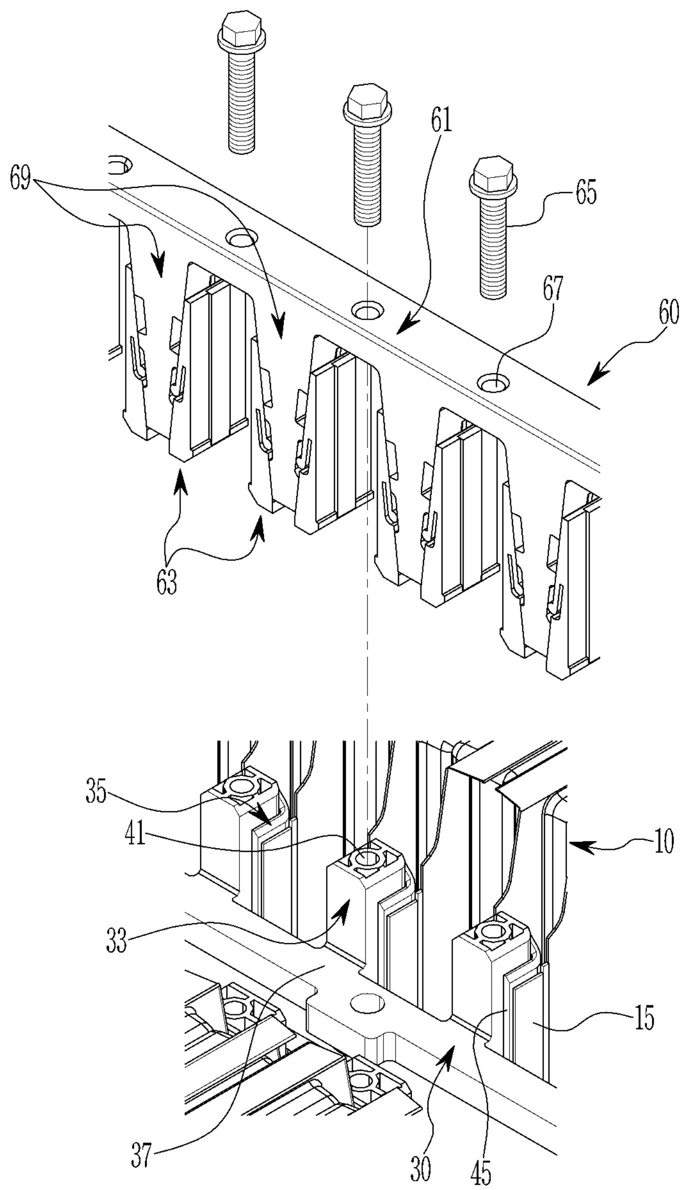
Figure 12:
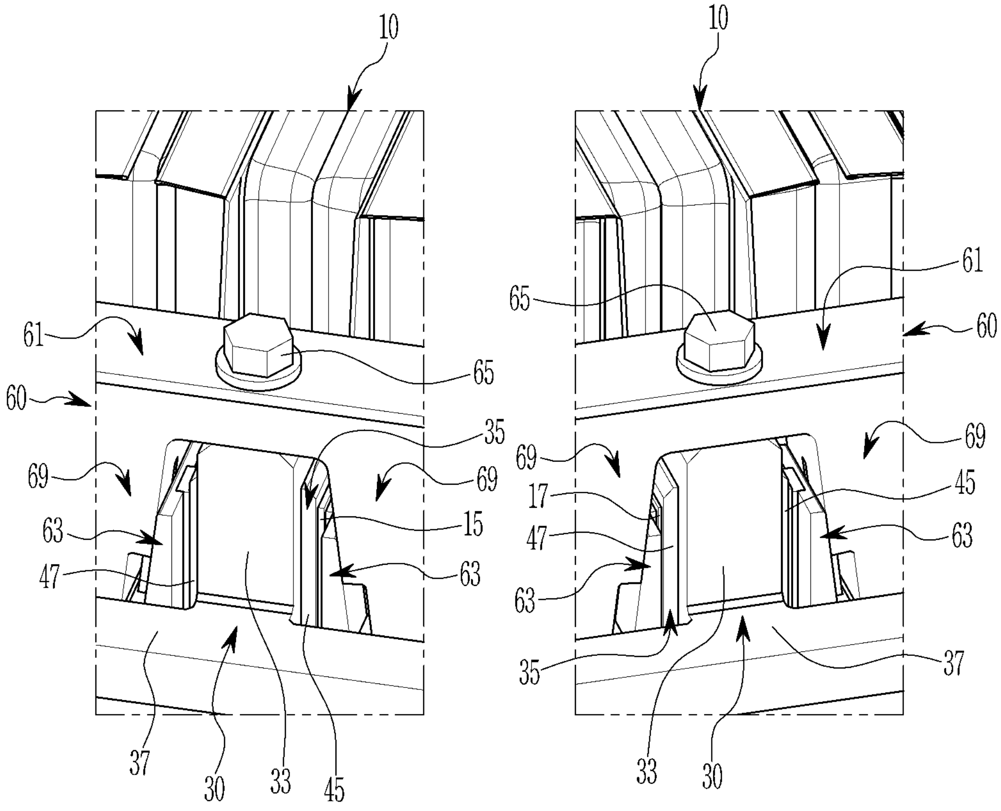
Figure 13:
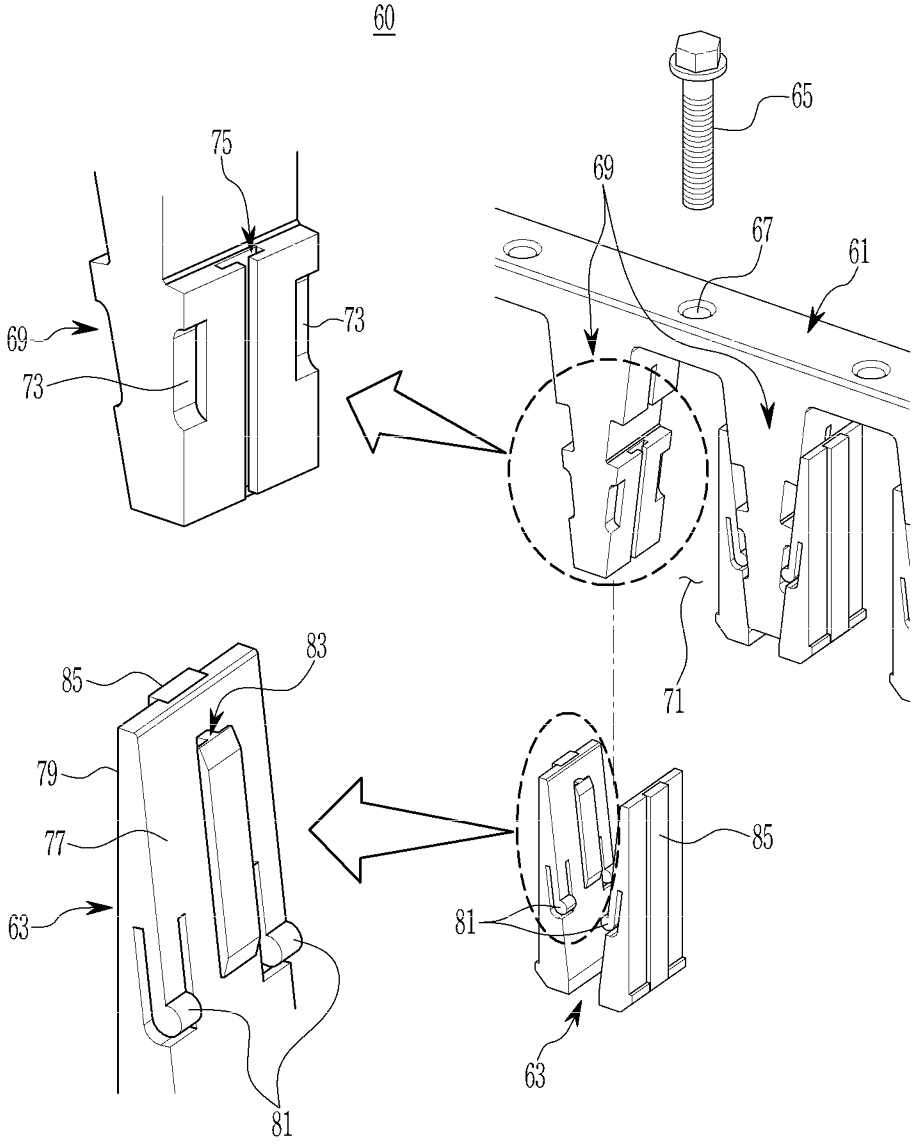

Here, in each of the plurality of battery cells 10 as shown in FIG. 9, the plurality of sensing busbars 35 may surface-contact (e.g., tight-contact) the positive electrode lead 15 and/or the negative electrode lead 17 of a copper material having relatively low contact resistance.

Each of the plurality of sensing busbars 35 may comprise a first portion a second portion 47, and/or a third portion 49.

The first portion 45 may comprise a contacting surface that surface-contacts the positive electrode lead 15. The second portion 47 may be connected to the first portion 45, and/or may comprise a contacting surface that surface-contacts the negative electrode lead 17.

In addition, or alternatively, the third portion 49 extends downward from a connection portion of the first portion 45 and/or the second portion 47. The third portion 49 may be electrically connected to the flexible PCB 43.

The joint portion 37 may be configured to engage the sensing circuit unit 30 to the pack tray 20. The joint portion 37 may be connected to the plurality of support portions 33. The joint portion 37 may be provided in a rod shape, and/or may be disposed along a length direction of the at least one cross member 23.

The joint portion 37 may be engaged to the at least one cross member 23 via at least one fastening bolt 51. A coupling hole 53 coupled to at least one fastening bolt 51 may be formed in the joint portion 37.

The rubber pad 39 may be configured to prevent the plurality of battery cells 10 from slipping on the base portion 31. The rubber pad 39 may be attached to the upper surface of the base portion 31. In an example, the rubber pad 39 may be a pad of a silicone material or a urethane material.

Referring to FIG. 3, in an example, the sensing block unit 60 may be configured to force the negative electrode lead 17 and/or the positive electrode lead 15 of each of the plurality of battery cells 10 surface-contacting the plurality of sensing busbars 35 to tight-contact the plurality of sensing busbars 35. That is, the sensing block unit 60 may be configured to electrically connect the plurality of sensing busbars 35 to the positive electrode lead 15 and/or the negative electrode lead 17. The sensing block unit 60 may be coupled (e.g., engaged) to the plurality of support portions 33 of the sensing circuit unit 30.

Referring to FIG. 10 to FIG. 13, the sensing block unit 60 according to an example may comprise a block body 61 and/or a plurality of wedge members 63.

The block body 61 may be disposed along a length direction of the joint portion 37 of the sensing circuit unit 30 and/or the at least one cross member 23, and/or may be coupled to the plurality of support portions 33.

The block body 61 may be engaged to the plurality of support portions 33 via at least one fastening bolt 65. The block body 61 may be formed with a coupling hole 67 to be coupled to the at least one fastening bolt 65. Here, the at least one fastening bolt 65 may be coupled to the coupling hole 67, and/or may be engaged to the threaded fastening hole 41 of the plurality of support portions 33.

Furthermore, the block body 61 may comprise a plurality of rib portions 69 that may be spaced apart by a preset interval along the alignment direction of the plurality of battery cells 10, that is, along a length direction of the block body 61.

In an example, the plurality of rib portions 69 may be formed in a shape in which a spacing between opposing surfaces that faces each other gradually increases downward. That is, each of the plurality of rib portions 69 may be formed in a shape in which the cross-section narrows downward.

Here, a preset space 71 may be formed between the plurality of rib portions 69. Each of the plurality of support portions 33 that may be respectively coupled to the plurality of sensing busbars 35 may be inserted into the space 71.

Each of the plurality of rib portions 69 may comprise at least one hook catching indentation 73 formed on the opposing surfaces. In addition, or alternatively, each of the plurality of rib portions 69 may comprise at least one rail groove 75 formed on the opposing surfaces along the vertical direction.

In addition, or alternatively, the plurality of wedge members 63 may be configured to substantially tight-contact the positive electrode lead 15 and/or the negative electrode lead 17 of the plurality of battery cells 10 to the plurality of sensing busbars 35. The plurality of wedge members 63 may be coupled to the opposing surfaces of the plurality of rib portions 69.

In an example, each of the plurality of wedge members 63 may be formed in a cross-section of a right triangle having a hypotenuse surface 77 coupled to the opposing surfaces of the plurality of rib portions 69. In each of the plurality of wedge members 63, an opposite surface of the hypotenuse surface 77 may be defined as a right-angled surface 79.

In addition, or alternatively, the plurality of wedge members 63 (e.g., each of the plurality of wedge members 63) may comprise at least one hook protrusion 81 coupled to the at least one hook catching indentation 73 of each of the plurality of rib portions 69. The at least one hook protrusion 81 may be formed on the hypotenuse surface 77 of each of the plurality of wedge members 63.

In addition, or alternatively, the plurality of wedge members 63 (e.g., each of the plurality of wedge members 63) may comprise at least one guide rail 83 slidably coupled to the at least one rail groove 75 of the plurality of rib portions 69 (e.g., each of the plurality of rib portions 69). The plurality of wedge members 63 may be coupled to the plurality of rib portions 69 in the vertical direction. The at least one guide rail 83 may be formed on the hypotenuse surface 77 of each of the plurality of wedge members 63.

Furthermore, the plurality of wedge members 63 (e.g., each thereof) may comprise a tight-contact rod 85 configured to tight-contact the positive electrode lead 15 and/or the negative electrode lead 17 of the plurality of battery cells 10 to the plurality of sensing busbars 35.

The tight-contact rod 85 may be vertically coupled to the right-angled surface 79. In an example, the tight-contact rod 85 may be formed of a urethane material.

The plurality of support portions 33 coupled with the plurality of sensing busbars 35 may be vertically coupled between the opposing surfaces of the plurality of wedge members 63. The plurality of support portions 33 may be vertically inserted between the plurality of wedge members 63, e.g., in the space 71 formed between the plurality of rib portions 69.

Referring to FIG. 1 and FIG. 2, the tray cover 90 may be configured to cover an upper portion of the pack tray 20. The tray cover 90 may be coupled to the upper portion of the pack tray 20.

The tray cover 90 may be engaged to the pack tray 20, for example, via at least one fastening bolt 91. The at least one fastening bolt 91 may be engaged to a nut member 93 (refer to FIG. 5, FIG. 6, and/or FIG. 8), which may be coupled to the at least one cross member 23. In addition, or alternatively, the tray cover 90 may be coupled to the upper portion of the pack tray 20, (e.g., by an interposing sealing gasket, not shown).

In FIG. 2, a wire harness 95 may be provided as an electrical component. A junction busbar 97 may be provided as an electrical component.

Hereinafter, a method of assembling the battery pack 100 according to an example is described in detail with reference to FIG. 1 to FIG. 13.

The pack tray 20 may be provided, and may comprise the at least one cross member 23 and/or the at least one cell barrier 25. The interior of the pack tray 20 may be partitioned into a plurality of regions by the at least one cross member 23 and/or the at least one cell barrier 25.

The sensing circuit unit 30, which may comprise the base portion 31, the plurality of support portions 33, the plurality of sensing busbars 35, and/or the joint portion 37 may be provided. The base portion 31 may be provided in a plurality, which may be interconnected. The plurality of support portions 33 may be connected to the base portion 31. The joint portion 37 may be connected to the plurality of support portions 33. Each sensing busbar of the plurality of sensing busbars 35 may be coupled to each support portion of the plurality of support portions 33. Furthermore, the rubber pad 39 may be attached to the upper surface of the base portion 31.

The base portion 31 may be disposed on the interior bottom surface 21 of the pack tray 20 in a region of the plurality of regions. For example, a base portion may be disposed in each of the plurality of regions. The joint portion 37 may be engaged to the at least one cross member 23 via at least one fastening bolt 51. The wire harness 95 may be electrically connected to the sensing circuit unit 30.

The plurality of battery cells 10 may be disposed on an upper surface of the rubber pad 39 along an alignment direction of the plurality of support portions 33. The plurality of battery cells 10 may be disposed in the at least one cell array 13 on the base portion 31.

The positive electrode lead 15 and/or the negative electrode lead 17 of each of the plurality of battery cells 10 may contact (e.g., surface-contact) the plurality of sensing busbars 35, and/or may interpose each of the plurality of support portions 33.

The block body 61 having the plurality of rib portions 69 may be provided with the sensing block unit 60 comprising the plurality of wedge members 63.

The plurality of wedge members 63 may be coupled to the opposing surfaces of the plurality of rib portions 69. Also, or alternatively, the tight-contact rod 85 may be vertically coupled to the plurality of wedge members 63.

The plurality of wedge members 63 may be slidably coupled to the at least one rail groove 75, which may be formed on the plurality of rib portions 69, via the at least one guide rail 83. The plurality of wedge members 63 may be coupled to the at least one rail groove 75 in the vertical direction. In addition, or alternatively, the plurality of wedge members 63 may be hook-coupled to the at least one hook catching indentation 73 formed on each of the plurality of rib portions 69 via the at least one hook protrusion 81.

The plurality of rib portions 69 may be vertically inserted between the plurality of support portions 33. The plurality of support portions 33 (e.g., each of the plurality of support portions 33 to which the plurality of sensing busbars 35 may be respectively coupled) may be vertically coupled between the plurality of wedge members 63 (e.g., in the space 71 between the plurality of rib portions 69).

The block body 61 may be coupled to the plurality of support portions 33 (e.g., via the at least one fastening bolt 65). The at least one fastening bolt 65 may be coupled to the coupling hole 67 of the block body 61, and/or engaged to the threaded fastening hole 41 of the plurality of support portions 33.

The positive electrode lead 15 and/or the negative electrode lead 17 of the plurality of battery cells 10 may be electrically connected to the plurality of sensing busbars. For example, the positive electrode lead 15 and/or the negative electrode lead 17 may contact (e.g., tight-contact) the plurality of sensing busbars 35 (e.g., via the plurality of wedge members 63 and/or the tight-contact rod 85).

The junction busbar 97 may be electrically connected to the sensing circuit unit 30, and/or the tray cover 90 may be coupled to the upper portion of the pack tray 20 (e.g., via the at least one fastening bolt 91). The at least one fastening bolt 91 may be engaged with the nut member 93 coupled to the at least one cross member 23.

The battery pack 100 may be assembled as described above and/or may be mounted to a lower portion of a vehicle body (e.g., in an assembly process of a vehicle comprising the vehicle body).

The battery pack 100 may be assembled in a cell-to-pack structure that stores the plurality of battery cells 10 comprising the solid state secondary battery cell 11.

In battery pack 100, the battery pack 100 may be modularized by integrating the plurality of battery cells 10 instead of merely containing the plurality of battery cells 10 as separate component parts, and thus more battery cells 10 may be stored in a limited space.

In the battery pack 100, due to the characteristics of the solid state secondary battery cell 11, the plurality of battery cells 10 may be configured in a non-cooling and non-pressurizing structure. A cooling component for cooling the plurality of battery cells 10 and/or a pressurizing component for pressurizing the plurality of battery cells 10 may not be necessary.

In the battery pack 100 does not require redundant and/or additional mechanical structure for storing the plurality of battery cells 10, which may increase a space for storing the plurality of battery cells 10. A volume ratio of the plurality of battery cells 10 to the volume of the battery pack 100 may be increased.

Furthermore, in the battery pack 100, the plurality of battery cells 10 may be electrically connected in a non-welding structure by the sensing circuit unit 30 and/or the sensing block unit 60.

The present battery pack 100 may use fewer parts for electrically connecting the plurality of battery cells 10, may be assembled simply, and/or may enable easy replacement of a battery cell of the plurality of battery cells 10.

The present disclosure provides a battery pack and an assembling method thereof, which may be capable of maximizing a volume ratio of a plurality of battery cells, reducing the number of components, and simplifying an assembly process.

An exemplary battery pack is provided in which a plurality of battery cells, each being formed as a solid state secondary battery cell, are aligned in a preset direction. The battery pack may comprise a pack tray, a sensing circuit unit coupled to the pack tray and comprising a plurality of sensing busbars that are electrically connected to leads provided in the plurality of battery cells, respectively, a sensing block unit vertically coupled to the sensing circuit unit and comprising a plurality of wedge members configured to tight-contact the leads and the plurality of sensing busbars, and a tray cover coupled to an upper portion of the pack tray.

The pack tray may comprise at least one cross member installed on an interior bottom surface along an alignment direction of the plurality of battery cells, and coupled to the sensing circuit unit, and at least one cell barrier installed on the interior bottom surface along a direction crossing the at least one cross member.

The sensing circuit unit may comprise a base portion installed on an interior bottom surface of the pack tray and configured to support at least one cell array having an arrangement of the plurality of battery cells, and a plurality of support portions connected to the base portion, disposed apart from each other at a preset interval along an alignment direction of the plurality of battery cells, and configured to support each of the plurality of sensing busbars.

The sensing circuit unit may comprise a base portion installed on an interior bottom surface of the pack tray and configured to support at least one cell array having an arrangement of the plurality of battery cells, and The sensing circuit unit may comprise a plurality of support portions connected to the base portion, disposed apart from each other at a preset interval along an alignment direction of the plurality of battery cells, and configured to support each of the plurality of sensing busbars.

The sensing circuit unit may further comprise a joint portion connected to the plurality of support portions, and engaged with at least one cross member installed on the interior bottom surface of the pack tray.

Tach of the plurality of sensing busbars may surround each of the plurality of support portions and may be fixed to the base portion, and the plurality of sensing busbars may be electrically connected to each other via a flexible PCB.

Each of the plurality of support portions may be provided in a rectangular cross-section shape, and formed with a threaded fastening hole in an upper portion.

The sensing circuit unit may further comprise a rubber pad attached to an upper surface of the base portion.

Each of the plurality of sensing busbars may comprise a first portion surface-contacting a positive electrode lead of a copper material provided in each of the plurality of battery cells, and a second portion surface-contacting a negative electrode lead of a copper material provided in each of the plurality of battery cells, and connected to the first portion.

The sensing block unit may comprise a block body coupled to the plurality of support portions and comprising a plurality of rib portions formed apart from each other at a preset interval along the alignment direction of the plurality of battery cells.

Each of the plurality of wedge members may be coupled to opposing surfaces of the plurality of rib portions.

Each of the plurality of support portions may be inserted into a space between the plurality of rib portions.

The plurality of rib portions may be formed in a shape in which a spacing between opposing surfaces of adjacent rib portions gradually increases downward. That is, each of the plurality of rib portions may be formed in a shape in which the cross-section narrows downward.

Each of the plurality of wedge members may be formed in a cross-section of a right triangle having a hypotenuse surface coupled to the opposing surfaces of the plurality of rib portions.

Each of the plurality of rib portions may comprise at least one hook catching indentation formed on opposing surfaces.

Each of the plurality of wedge members may comprise at least one hook protrusion coupled to the at least one hook catching indentation.

Each of the plurality of rib portions may comprise at least one rail groove formed on opposing surfaces along a vertical direction.

Each of the plurality of wedge members may comprise at least one guide rail slidably coupled to the at least one rail groove.

Each of the plurality of wedge members may be vertically coupled with a tight-contact rod of a urethane material configured to tight-contact the leads to the plurality of sensing busbars.

An exemplary assembling method of a battery pack comprises coupling a sensing circuit unit to a pack tray, disposing a plurality of battery cells on a base portion of the sensing circuit unit in a preset direction, electrically connecting leads provided in each of the plurality of battery cells to a plurality of sensing busbars of the sensing circuit unit, coupling a sensing block unit to the sensing circuit unit, tight-contacting the leads to the plurality of sensing busbars via a plurality of wedge members of the sensing block unit, and coupling a tray cover to an upper portion of the pack tray.

In the tight-contacting the leads to the plurality of sensing busbars, the plurality of wedge members may tight-contact the leads to the plurality of sensing busbars along an alignment direction of the plurality of battery cells.

The plurality of sensing busbars may be coupled to a plurality of support portions of the sensing circuit unit.

The plurality of wedge members may be coupled to a plurality of rib portions provided in a block body of the sensing block unit.

The plurality of support portions may be vertically inserted between wedge members that face each other.

The block body may be engaged to the plurality of support portions.

According to an example, due to characteristics of the solid state secondary battery cell, a battery pack may be configured in a non-cooling, non-pressurizing, and non-welding structure of a plurality of battery cells, thereby maximizing a volume ratio of the plurality of battery cells.

This disclosure is not limited to the above described examples, but covers various modifications and equivalent arrangements comprised within the spirit and scope of the appended claims.

What is claimed is:

1. A battery pack comprising:

a plurality of battery cells, wherein each of the plurality of battery cells is a solid state secondary battery cell, and wherein the plurality of battery cells are aligned in an alignment direction;

a pack tray;

a sensing circuit coupled to the pack tray and comprising a plurality of sensing busbars; and a sensing block coupled to the sensing circuit and comprising a plurality of wedges configured to contact leads of the plurality of battery cells and the plurality of sensing busbars, wherein the leads and the plurality of sensing busbars are electrically connected in a non-welding structure via a compressive force of the plurality of wedges.

2. The battery pack of claim 1, wherein the pack tray comprises:

at least one cross member installed on an interior surface of the pack tray and along the alignment direction, and coupled to the sensing circuit; and at least one cell barrier installed on the interior surface along a direction crossing the at least one cross member.

3. The battery pack of claim 1, wherein the sensing circuit comprises:

a base connected to an interior surface of the pack tray and configured to support the aligned plurality of battery cells; and a plurality of supports connected to the base, disposed apart from each other along the alignment direction of the plurality of battery cells, and configured to support the plurality of sensing busbars.

4. The battery pack of claim 3, wherein the sensing circuit further comprises a joint connected to the plurality of supports, and engaged with at least one cross member installed on an interior surface of the pack tray.

5. The battery pack of claim 3, wherein:

each of the plurality of sensing busbars surrounds a respective support of the plurality of supports and is fixed to the base; and the plurality of sensing busbars are electrically connected to each other.

6. The battery pack of claim 3, wherein each of the plurality of supports comprises a rectangular cross-section shape, and is formed with a threaded fastening hole.

7. The battery pack of claim 3, wherein the sensing circuit further comprises a rubber pad attached to an upper surface of the base, and wherein the battery pack has a cell-to-pack structure.

8. The battery pack of claim 1, wherein each of the plurality of sensing busbars comprises:

a first portion configured to contact a positive electrode lead provided in each of the plurality of battery cells, the positive electrode lead being made of a copper material; and a second portion connected to the first portion and configured to contact a negative electrode lead provided in each of the plurality of battery cells, the negative electrode lead being made of a copper material.

9. The battery pack of claim 3, wherein the sensing block comprises:

a block body coupled to the plurality of supports and comprising a plurality of ribs formed apart from each other along the alignment direction of the plurality of battery cells.

10. The battery pack of claim 9, wherein:

each wedge, of the plurality of wedges, is coupled to a respective surface of a rib, of the plurality of ribs, wherein the surface of the rib and an opposing surface of an adjacent rib, of the plurality of ribs, form a space between the rib and the adjacent rib; and a support of the plurality of supports is configured to be inserted into the space.

11. The battery pack of claim 9, wherein a spacing between opposing surfaces of adjacent ribs increases in a direction away from the block body.

12. The battery pack of claim 11, wherein each of the plurality of wedges comprises a surface coupled to the respective surface.

13. The battery pack of claim 9, wherein:

each of the plurality of ribs comprises at least one hook catching indentation formed on a surface opposing another of the plurality of ribs; and each of the plurality of wedges comprises at least one hook protrusion configured to couple to the at least one hook catching indentation.

14. The battery pack of claim 9, wherein:

each of the plurality of ribs comprises at least one rail groove formed on a surface opposing another of the plurality of ribs; and each of the plurality of wedges comprises at least one guide rail configured to slidably couple to the at least one rail groove.

15. The battery pack of claim 1, wherein each of the plurality of wedges comprises a rod configured to press the leads to the plurality of sensing busbars, and wherein the rod is formed of a urethane material.

16. An assembling method, comprising:

coupling a sensing circuit to a pack tray;

disposing a plurality of battery cells on a base of the sensing circuit in an alignment direction, wherein each of the plurality of battery cells is a solid state secondary battery cell;

electrically connecting leads provided in each of the plurality of battery cells to a plurality of sensing busbars of the sensing circuit in a non-welding structure;

coupling a sensing block to the sensing circuit; and contacting the leads to the plurality of sensing busbars via a compressive force of a plurality of wedges of the sensing block.

17. The assembling method of claim 16, wherein, the contacting the leads to the plurality of sensing busbars comprises contacting the leads to the plurality of sensing busbars along the alignment direction.

18. The assembling method of claim 16, further comprising:

coupling the plurality of sensing busbars to a plurality of supports of the sensing circuit; and coupling the plurality of wedges to a plurality of ribs extending from a block body of the sensing block.

19. The assembling method of claim 18, further comprising:

inserting the plurality of supports between wedges such that the block body contacts the plurality of supports.

20. The battery pack of claim 1, wherein a pair of wedges of the plurality of wedges are configured to surround and press a lead of the leads to a sensing busbar of the plurality of sensing busbars.

* * * * *